US006961789B2

(12) United States Patent
McIntyre

(10) Patent No.: US 6,961,789 B2
(45) Date of Patent: Nov. 1, 2005

(54) MOPYMULTIPLE-ORIGINAL-OUTPUT CONTROL FOR MULTIFUNCTION DEVICES

(75) Inventor: C. Kevin McIntyre, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 09/728,097

(22) Filed: Dec. 1, 2000

(65) Prior Publication Data

US 2002/0069234 A1 Jun. 6, 2002

(51) Int. Cl.[7] .............................................. G06F 13/12

(52) U.S. Cl. ........................... 710/62; 710/33; 710/64; 709/104; 358/1.12; 358/1.13

(58) Field of Search .... 710/62–65, 33; 358/1.11–1.15; 709/104

(56) References Cited

U.S. PATENT DOCUMENTS 5,396,345 A * 3/1995 Motoyama .................. 358/448
5,915,111 A * 6/1999 Ouchi ........................ 709/107
5,925,116 A * 7/1999 Minamizawa ................ 710/64
5,982,510 A * 11/1999 Funahashi ................... 358/468
6,195,172 B1 * 2/2001 Minamizawa .............. 358/1.15
6,246,487 B1 * 6/2001 Kobayashi et al. ........ 358/1.13
6,308,023 B1 * 10/2001 Nomura et al. ............... 399/81
6,421,748 B1 * 7/2002 Lin et al. ...................... 710/65
6,476,935 B1 * 11/2002 Fujino ........................ 358/400
6,577,907 B1 * 6/2003 Czyszczewski et al. ...... 700/17
6,580,966 B2 * 6/2003 Shimada ..................... 700/223
6,798,530 B1 * 9/2004 Buckley et al. ............ 358/1.13

* cited by examiner

*Primary Examiner*—Jeffrey Gaffin
*Assistant Examiner*—Mike Nguyen

(57) ABSTRACT

An implementation of an improved Multiple-Original-Output ("Mopying") technology for multifunction devices (MFDs), described herein, enables a user at a computer to fully control and access the functions of a Mopy-enabled MFD. With this technology, the user fully controls the source (e.g. data and paper) for each Mopy of a Mopy job. Similarly, the user fully controls the destination (e.g. paper and communications) for each Mopy of a Mopy job. This abstract itself is not intended to limit the scope of this patent. The scope of the present invention is pointed out in the appending claims.

14 Claims, 4 Drawing Sheets

(Background)

MOPYMULTIPLE-ORIGINAL-OUTPUT CONTROL FOR MULTIFUNCTION DEVICES

TECHNICAL FIELD

This invention generally relates to an improved technology for controlling Mopymultiple-original-output ("Mopying") on multifunction devices (MFDs). More particularly, this invention generally relates to an improved technology for controlling source and destination of specific outputs of a multiple-original-output job on MFDs.

BACKGROUND

Mopying

The term "Mopy" is short for a function often called "Multiple Original Copies", "Multiple Original Prints", or "Multiple Original Output". A Mopy-enabled product produces "Mopies," whereas a photocopier produces copies.

Advances in digital technology have created a trend towards reliable, affordable multifunction equipment in place of traditional stand-alone, single purpose devices like photocopiers and fax machines. While the need for copying will continue to exist, more complete multifunctional solutions are being developed that will substitute for or replace traditional photocopier and fax devices.

To Mopy, a computer user, typically, sets an option to print a given number of copies of a document via an application or a printer driver interface. However, use of conventional non-mopied printers for Mopying can cause a slower return to applications for users as the computer generates multiple collated sets on the host, which results in higher network traffic as the file size increases.

Mopy-enabled printers utilize intelligent firmware and host software to improve throughput and eliminate the issues above. The printer driver transmits the file only once and sends appropriate header information (e.g., the number of copies) to the printer for rasterization and spooling. The printer rasterizes the job only once and then prints multiple, original copies in the manner determined by a user. Mopy printing is particularly useful for complex jobs that slow down the printer when the first copy is created or takes a long time to transmit over a network.

Mopying allows users to take advantage of the advanced processing and finishing capabilities of the printer, instead of burdening their own computer and the network. Compared to traditional alternatives like making copies on photocopiers, Mopying results in a more efficient, productive work process; the sharp quality of a first generation document (rather than a copy); increased reliability; and the convenience of desktop control and management.

Multifunction Devices

Generally, a Mopy-enabled printer is a printer that produces multiple original prints. Mopying a document reduces the amount of data sent to the printer, which provides a faster return to the application and reduces network traffic. Examples of Mopy-enabled printers include: The Hewlett-Packard Company (henceforth "HP") LaserJet® 4000, 5000, 4050, 8000, 8100 Series printers.

Many of the existing Mopy-enabled printers are also multifunction devices (MFDs). As the name implies, a MFD is a device capable multiple functions. Most of the functions are related to printing, paper handling, or data communication. Examples of the functions performed by a MFD include (but are not limited to):

printing;
Mopying;
copying;
send/receive fax;
send/receive e-mail;
image acquisition;
text recognition;
source paper handling (such as high capacity input (HCI); trays
having differing paper sizes/types; envelope trays);
destination paper handling (such as stacking; stapling; sorting; collating; mailboxes);
data acquisition (network; serial; USB; parallel; IR; floppy disk; hard disk; RAM; flash cards; any other media).

FIG. 1 illustrates a conventional Mopying scenario 100. A client computer 102, as directed by a user 104, sends a print job 106 to a MFD 11O via a network 108. A print job directs a printer to print a document (consisting of one or more pages). Using the printer driver, the user 104 directs the MFD to print multiple original copies (i.e., Mopies) of each page in print job 106. Thus, print job 106 may be referred to as a Mopy job 106. A Mopy job directs a printer to print a document (consisting of one or more pages) multiple times, but the document is sent to the printer only once and is only rasterized once.

As is conventional, the MFD 110 pulls paper from a single source 120, such as an input stack 122. There may be multiple sources available, but each page of a Mopy is only pulled from one source although a particular Mopy job may use multiple sources. Examples of such sources include a tray of legal sized paper; a tray of letter sized paper; a tray of blue paper; an envelope tray; etc.

Likewise, the MFD 110 sends the printed Mopies to a single destination 130, such as an output stack 132. There may be multiple destinations available, but each page of a Mopy is only delivered to one destination. Examples of such destinations include a paper stacker; a paper stapler; a mailbox; e-mail; fax; etc.

Although these Mopy-enabled multifunction devices have a large array of functions, users of such devices are conventionally restricted from fully utilizing all of the capability of such devices or instructing individual Mopies fro/from different devices.

SUMMARY

Described herein is an improved Multiple-Original-Output ("Mopying") control technology for multifunction devices (MFDs). Such technology enables a user at a computer to fully control and access the functions of a Mopy-enabled MFD. With this technology, the user fully controls the source (e.g. data and paper) for each Mopy of a Mopy job. Similarly, the user fully controls the destination (e.g. paper and communications) for each Mopy of a Mopy job.

This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of an improved multiple-original-output ("Mopying") control for multifunction devices that incorporate elements recited in the appended claims. These embodiments are described with specificity in order to meet statutory written description, enablement, and best-mode requirements. However, the description itself is not intended to limit the scope of this patent.

Described herein are one or more exemplary implementations of an improved Mopying control for multifunction devices. The inventor intends these exemplary implementations to be examples. The inventor does not intend these exemplary implementations to limit the scope of the claimed present invention. Rather, the inventor has contemplated that the claimed present invention might also be embodied and implemented in other ways, in conjunction with other present or future technologies.

An example of an embodiment of an improved Mopying control for multifunction devices may be referred to as an "exemplary Mopying control."

Exemplary Mopying Control Scenario

Figure 2:
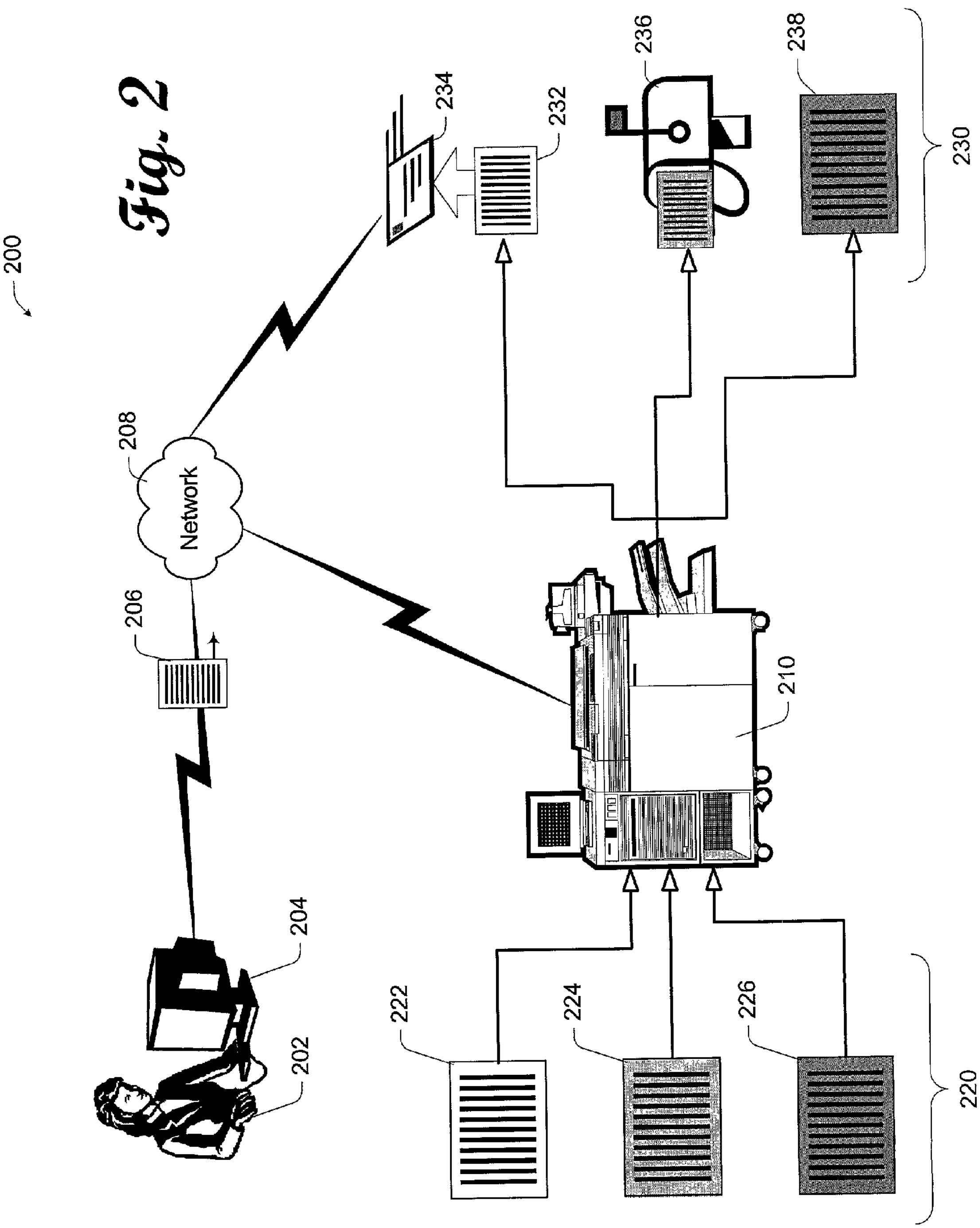
FIG. 2 is a schematic diagram of a multifunction device (MFD) on a network with a client. This diagram illustrates an example of a Mopying scenario in accordance with an implementation of the invention claimed herein.

FIG. 2 illustrates an exemplary scenario 200 in which an exemplary Mopying control is implemented. A client computer 202, as directed by a user 204, sends a Mopy job 206 to a MFD 210 via a network 208. Using a printer driver, the user 204 directs the MFD 210 to print multiple original copies (i.e., Mopies) of each page in job 206. Thus, job 206 is a Mopy job 226.

In the exemplary scenario, the user 204 would like for each of the Mopies of the Mopy job 206 to pull paper in from different sources 220. For example:

- One Mopy on white, draft, letter-sized paper 222;
- Another Mopy on blue, draft, letter-sized paper 224;
- Still another Mopy on bond, letter-sized paper 226; and
- Further still another Mopy on a transparency (not shown).

Furthermore, the user 204 would like for the Mopies to have multiple destinations 230. In other words, not all of the Mopies are stacked together. For example:

- One Mopy stacked in the regular destination stacks 238;
- Another sent to a mailbox 236 of a specific person;
- Still another 232 sent via e-mail 234 (thus, it need never be physically printed);
- Further still another sent via fax (not shown)

Figure 1:
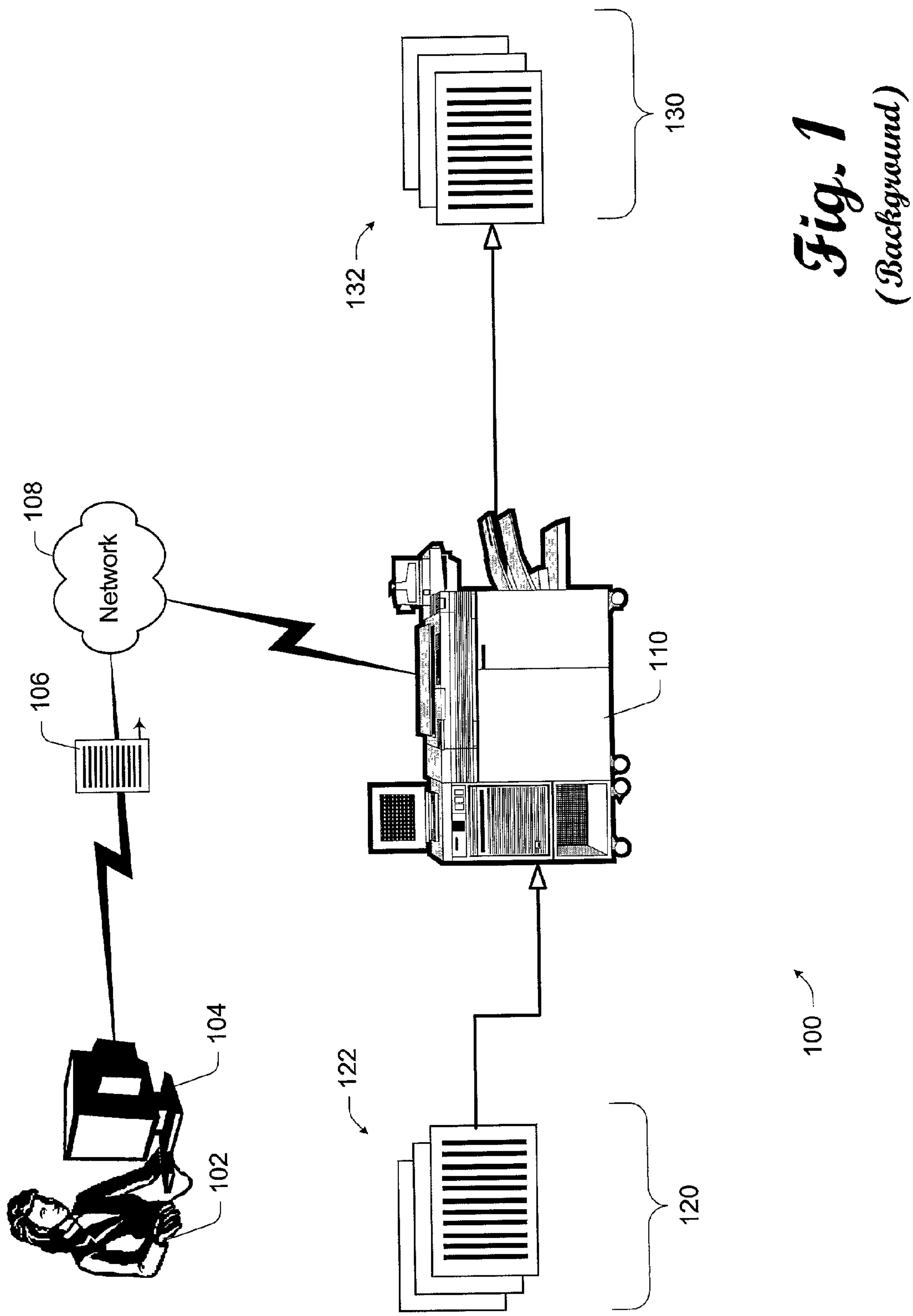
FIG. 1 is a schematic diagram of a multifunction device (MFD) on a network with a client. This diagram illustrates a conventional Mopying scenario.

If this were a conventional scenario as shown in FIG. 1, the MFD 210 would pull paper from a single source. Likewise, if this were a conventional scenario, the MFD 210 would send the printed Mopies to a single destination.

To satisfy his Mopying needs listed, the user 202 most likely will not employ the Mopying function of the MFD. Since the user is forced to live with no source and destination choices, the user is likely to print one copy and manually copy on a photocopier the document onto other types of paper. The user will manually fax a printed document. The user will manually email the document. The user will manually place copies in the mailboxes of others.

However, in the exemplary scenario 200 of FIG. 2, in which an exemplary Mopying control is implemented, the user 202 has options to select one or more sources 220 and one or more destinations 230. The user is given the option to select such sources and destinations via a printer dialog box (e.g., graphical user interface) on the client 204. Such a dialog box may be provided by an application or a printer driver.

Examples of the sources (data and physical media, such as paper) that may be selected by a user include (but are not limited to):

- received fax;
- an e-mail;
- image acquisition (e.g., scanner);
- text recognition for a source image;
- high capacity input (HCI);
- trays having differing paper sizes/types;
- envelope trays;
- an electronic source (for data) and no paper when the destination is electronic;
- data acquisition (network; serial; USB; parallel; IR; floppy disk; hard disk; RAM; scanner; flash cards; any other media).

Examples of the destinations (data and physical media, such as paper) that may be selected by a user include (but are not limited to):

- sending fax;
- sending e-mail;
- stacking;
- stapling;
- sorters;
- collating;
- high capacity output (HCO)
- mailboxes;
- data transmission (network; serial; USB; parallel; IR; floppy disk; hard disk; RAM; flash cards; any other media).

Furthermore, the user 204 can build a customized profile to configure a standard Mopying control. The user presumably names or identifies the profiles. The profiles may be saved in a secondary non-volatile memory (e.g., hard drive) of a client (or server). When the user wishes to direct the MFD in standard manner, the user invokes the saved profile to do so. This may be called "Mopy job profiling."

Exemplary Mopying Control

Figure 3:
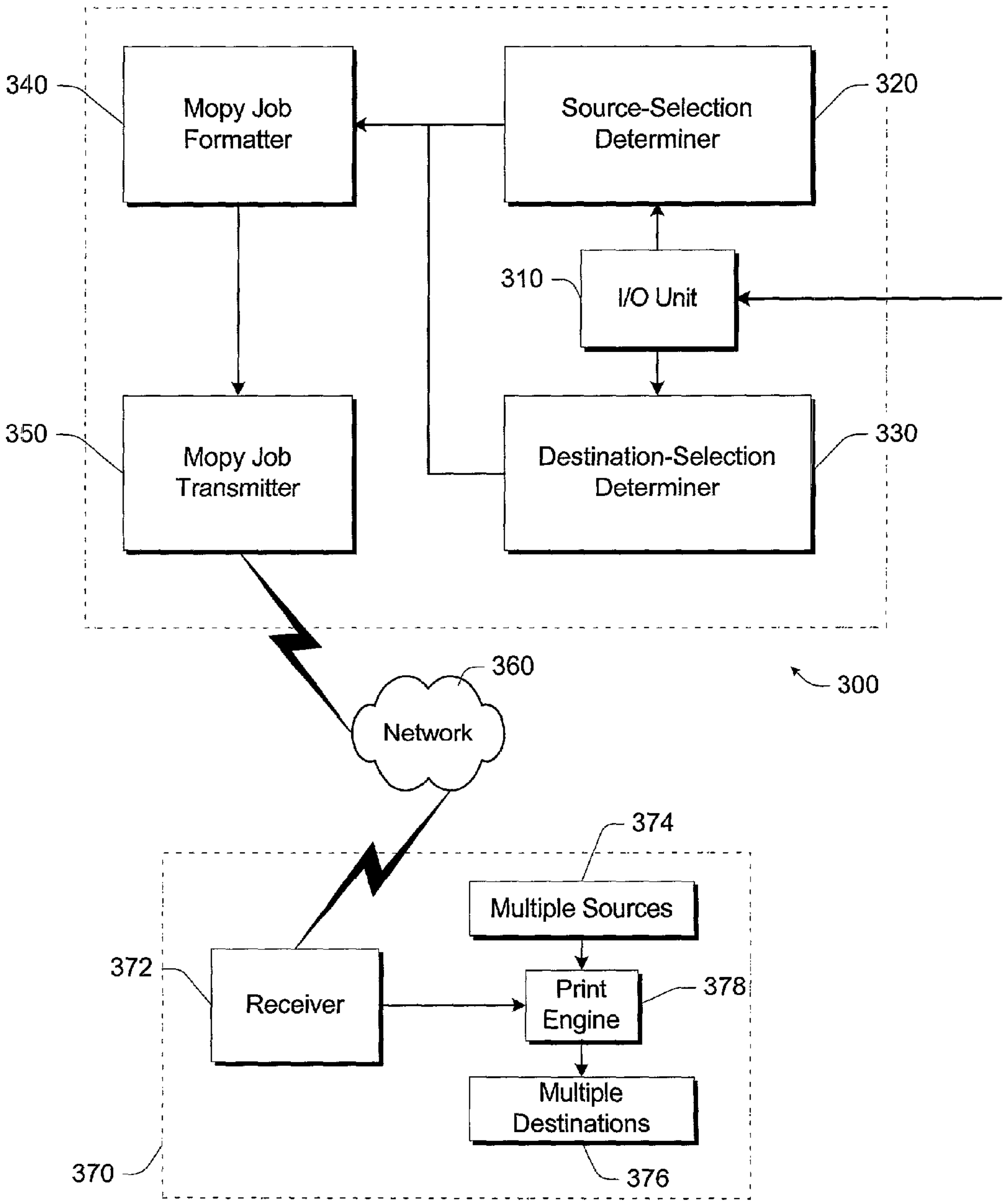
FIG. 3 is a block diagram of an exemplary system in accordance with an implementation of the invention claimed herein.

FIG. 3 shows a schematic block diagram of the exemplary Mopying control at the client and at the MFD. Mopy control system 300 includes I/O unit 310, source-selection determiner 320, destination-selection determiner 330, Mopy-job formatter 340, and Mopy-job transmitter 350. The Mopy control system may be implemented as part of a printer driver, application, operating system, or the like.

The I/O unit 310 receives input from the user. It may also present a GUI for the user. The user's source-selections are determined by the source-selection determiner 320. Likewise, the user's destination-selections are determined by the destination-selection determiner 330. These are sources and destinations on a MFD.

These determined selections are included in the Mopy job, which is generated and formatted by the Mopy-job formatter 340. The Mopy-job transmitter 350 sends this job via a network 360 to a MFD 370.

The MFD 370 includes a receiver 372, a conventional print engine 378, multiple sources 374 (such as those listed above), and multiple destinations 376 (such as those listed above).

The receiver 372 receives the Mopy job and transfers it to the print engine 378. The print engine prints the Mopies of the Mopy job. In doing so, it selects the designated source for each Mopy. Likewise, it selects the designated destination for each Mopy.

Methodological Implementation of the Exemplary Mopying Control

Figure 4:
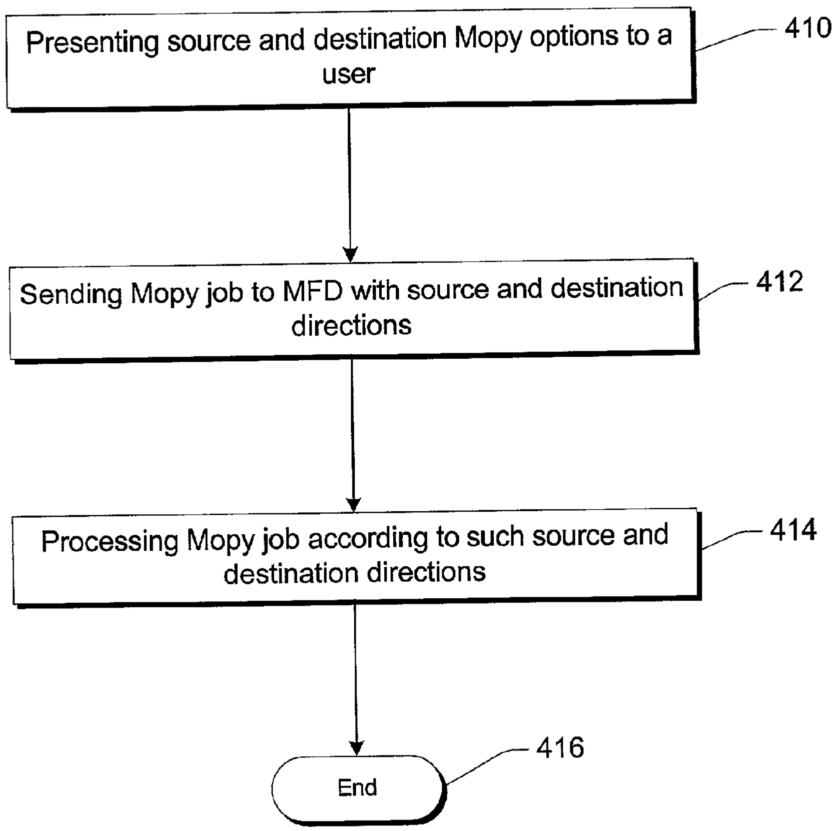
FIG. 4 is a flow diagram of an example of a methodological implementation of the invention claimed herein.

FIG. 4 shows methodological implementation of the exemplary Mopy-control performed by the MFD 210 (or some portion thereof) and/or client 204 (or some portion thereof). This methodological implementation may be performed in software, hardware, or a combination thereof.

At 410 of FIG. 4, the Mopying control presents a GUI (graphical user interface) to the user once the user has requested to print to a MFD. Such GUI includes an option for Mopy. It also includes options for selecting the source of each Mopy of a Mopy job. Furthermore, it includes options for selecting the destination of each Mopy of a Mopy job. In may also include a mechanism to save and retrieve Mopy job profiles. The user may select a profile; select amongst the various source/destination options; or a combination of both.

At 412, the client sends a Mopy job to the MFD. The Mopy job includes Mopying-control directions that specify the source and destination of each Mopy in a Mopy job.

At 414, the MFD processes such directions and prints the Mopy job accordingly. At 416, the process ends.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method, comprising:

a multi-function printing device receiving a Mopy job directing the device to output a document multiple times to different destinations after receiving electronic data representing the document only once and rasterizing the document only once; and the multi-function printing device outputting a first Mopy of the document to a first destination by printing a first printed Mopy of the document and outputting a second Mopy of the document to a second destination by faxing, emailing or otherwise transmitting a second electronic Mopy of the document.

2. A method, comprising:

a multi-function printing device receiving a Mopy job directing the device to print a document multiple times after receiving electronic data representing the document only once and rasterizing the document only once; and in response to receiving the Mopy job, the multi-function printing device printing a first Mopy of the document and discharging the first printed Mopy to a first location and printing a second Mopy of the document and discharging the second printed Mopy to a second location different from the first location.

3. The method of claim 2, wherein discharging the first printed Mopy to a first location comprises discharging the first printed Mopy to a first output tray and discharging the second printed Mopy to a second location comprises discharging the seconded printed Mopy to a second output tray different from the first output tray.

4. The method of claim 2, wherein discharging the first printed Mopy to a first location comprises discharging the first printed Mopy to one of a stacker, a stapler, a sorter and a collator and discharging the second printed Mopy to a second location comprises discharging the seconded printed Mopy to another of a stacker, a stapler, a sorter and a collator.

5. A method, comprising:

a multi-function printing device receiving a Mopy job directing the device to print a document multiple times after receiving electronic data representing the document only once and rasterizing the document only once; and in response to receiving the Mopy job, the multi-function printing device printing a first Mopy of the document on media selected from a first source and a printing a second Mopy of the document on media selected from a second source different from the first source.

6. A method, comprising:

a multi-function printing device receiving a Mopy job directing the device to print a document multiple times after receiving electronic data representing the document only once and rasterizing the document only once; and in response to receiving the Mopy job, the multi-function printing device printing a first page of each Mopy of the document on media selected from a first source and a printing a second page of each Mopy of the document on media selected from a second source different from the first source.

7. A computer readable medium having instructions thereon for:

identifying multiple sources of data for a document;

generating electronic data representing the document from the multiple sources of data; and a multi-function printing device receiving a Mopy job directing the device to print the document multiple times after receiving the electronic data representing the document only once and rasterizing the document only once.

8. The medium of claim 7, wherein the instructions for receiving a Mopy job reside on the multi-function printing device and the instructions for identifying multiple sources and generating electronic data reside on a client of the multi-function printing device.

9. The medium of claim 7, wherein the instructions for receiving a Mopy job and generating electronic data reside on the multi-function printing device and the instructions for identifying multiple sources reside on a client of the multi-function printing device.

10. The medium of claim 7, wherein the instructions for generating electronic data comprise instructions for the multi-function printing device generating electronic data representing the document from the multiple sources of data in response to receiving the Mopy job.

11. The medium of claim 7, wherein the instructions for identifying multiple sources of data comprise instructions for identifying at least one of a fax received at the device, an email received at the device, and an image scanned at the device.

12. A computer readable medium having instructions thereon for:

identifying multiple sources of data for a document;

generating electronic data representing the document from the multiple sources of data;

a multi-function printing device receiving a Mopy job directing the device to output the document multiple times to different destinations after receiving the electronic data representing the document only once and rasterizing the document only once; and outputting a first Mopy of the document to a first destination by printing a first printed Mopy of the document and outputting a second Mopy of the document to a second destination by faxing, emailing or otherwise transmitting a second electronic Mopy of the document.

13. A Mopy control system, comprising:

a source selection determiner configured to identify multiple sources of data for a document;

a destination selection determiner configured to identify printing a printed Mopy of the document and faxing, emailing or otherwise transmitting an electronic Mopy of the document; and a Mopy job formatter configured to generate electronic data representing the document from the multiple sources of data and to formulate a Mopy job directing a multi-function printing device to, after receiving the electronic data representing the document only once and rasterizing the document only once, printing a first printed Mopy of the document and faxing, emailing or otherwise transmitting a second electronic Mopy of the document.

14. A multi-function printing device, comprising:

a print engine;

a fax capability;

multiple sources of data for a document;

multiple destinations for Mopies of a document; and a receiver configured to a implement a Mopy job directing the device to, after receiving electronic data representing a document only once and rasterizing the document only once, printing a first printed Mopy of the document and faxing a second electronic Mopy of the document.

* * * * *